US006252594B1

United States Patent
Xia et al.

(10) Patent No.: US 6,252,594 B1
(45) Date of Patent: Jun. 26, 2001

(54) METHOD AND SYSTEM FOR AIDING A USER IN SCROLLING THROUGH A DOCUMENT USING ANIMATION, VOICE CUES AND A DOCKABLE SCROLL BAR

(75) Inventors: Chenhong Xia, Morgan Hill, CA (US); John Hudson Bailey, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/209,309

(22) Filed: Dec. 11, 1998

(51) Int. Cl.$^7$ ............................................. G06F 3/14
(52) U.S. Cl. .................. 345/341; 345/340; 345/973; 345/978; 707/526
(58) Field of Search .................. 345/326, 339, 345/340, 341, 973, 978; 707/525, 526, 529, 530

(56) References Cited

U.S. PATENT DOCUMENTS

| | | | |
|---|---|---|---|
| 4,839,857 | 6/1989 | Mersiovsky et al. | 369/25 |
| 4,884,974 | 12/1989 | DeSmet | 434/317 |
| 4,985,697 | 1/1991 | Boulton | 345/192 |
| 5,333,247 | * 7/1994 | Gest et al. | 395/138 |
| 5,402,152 | 3/1995 | Needham | 345/179 |
| 5,418,549 | 5/1995 | Anderson et al. | 345/145 |
| 5,452,413 | * 9/1995 | Blades | 395/159 |
| 5,538,430 | 7/1996 | Smith et al. | 434/178 |
| 5,655,094 | 8/1997 | Cline et al. | 345/341 |
| 5,680,636 | 10/1997 | Levine et al. | 707/512 |
| 5,760,771 | 6/1998 | Blonder et al. | 345/336 |
| 5,808,610 | * 9/1998 | Benson et al. | 345/342 |
| 5,973,663 | * 10/1999 | Bates et al. | 345/123 |

* cited by examiner

Primary Examiner—Raymond J. Bayerl
Assistant Examiner—Michael K. May
(74) Attorney, Agent, or Firm—Sawyer Law Group LLP; Prentiss W. Johnson

(57) ABSTRACT

A system and method for aiding a user in scrolling through a multiple-page are disclosed. The system and method include providing visual and/or audio cues in a graphical user interface (GUI) environment including a window to alert a user that a portion of the document is not currently displayed in the window. The scrolling may also be made more customizable and convenient. In a first aspect, the GUI includes a scroll bar which appears briefly at the center of a window. This indicates to the user that the document contains more than one page and that the user may scroll to view content beyond what is currently displayed. In this aspect, the scroll bar may be dynamic and dockable. Thus, in this aspect a mechanism is provided to allow the user to dock the scroll bar in a desired location. In a second aspect, the system and method include providing voice cues indicating the total number of pages in the document or that the document contains multiple pages. The voice cue may optionally indicate the current page number when the page is scrolled into the window. In another aspect, the method and system include providing variations on the scroll bar and the scrolling related GUI components. The user may customize the scroll bar and GUI components. Customization may include allowing the user to dock the GUI components used for scrolling. These components may be docked to the window's status bar to free additional space for the window.

37 Claims, 8 Drawing Sheets

METHOD AND SYSTEM FOR AIDING A USER IN SCROLLING THROUGH A DOCUMENT USING ANIMATION, VOICE CUES AND A DOCKABLE SCROLL BAR

FIELD OF THE INVENTION

The present invention relates to display of information on computer systems and more particularly to a method and system for aiding a user in browsing through a multiple-page document. The method and system notify the user that the document contains multiple pages based on the window size and that scrolling may be needed to view the content not currently displayed. The system and method further include providing mechanisms for customization and more convenient scrolling.

BACKGROUND OF THE INVENTION

A wide variety of documents contain multiple pages of information of interest to users. For example, hypertext markup language (html) documents residing on a server in the Internet or other online service contain content that can be viewed using a browser. Documents created using spreadsheets, word processing programs or other software can also contain information or other multimedia content of interest to a user.

Documents are typically displayed in windows. Each window typically contains a status bar at its lower edge, a vertical scroll bar at its right edge, and may have a horizontal scroll bar near the status bar. For a multiple page document, only a portion of the document is displayed by the window at a given instant. The vertical and horizontal scroll bars indicate that part of the document is not currently displayed and allow a user to scroll vertically and horizontally, respectively, through the document to view all of the information contained in the document.

Although scroll bars are useful, a user may ignore the scroll bar or may forget about the scroll bar because the scroll bar is an insignificant portion of the window. This is particularly true of an inexperienced user of a computer system. As a result, a user may fail to scroll through portions of a document which may be of interest.

Accordingly, what is needed is a system and method for drawing a user's attention to the fact that the document contains additional information that can be scrolled through. The present invention addresses such a need. The present invention also includes a method and system for customizing scrolling or making scrolling more convenient. For example, the present invention includes mechanisms for accounting for left-handed users or users having a small display.

SUMMARY OF THE INVENTION

The present invention provides a system and method for aiding a user in browsing and scrolling through a multiple-page document on a computer system including devices for audio and visual output, such as a display. The document is displayed through a graphical user interface including a window. The window may display a portion of the document at a time. The system and method comprise alerting a user that a portion of the document is not currently displayed. The method and system may also allow customization of and more convenient scrolling. A scroll bar and the components of the scroll bar allow a user to scroll through the document. In one aspect, the scroll bar briefly appears in the middle of the window and moves to a particular edge of the window. Preferably, the scroll bar is translucent while at the center of the window, but gradually becomes solid when at the edge of the window. In this aspect, the scroll bar may also be docked by the user at a desired position. In a second aspect, the method and system comprise providing a voice cue that indicates the total number of pages in the document when the document is first accessed by a user and optionally indicates the current page number when the user accesses a new page. In a third aspect, components of the scroll bar may be located at a status bar of the window. Thus, the user may keep a scroll shaft and scroll box at an edge of the window or dock the scroll shaft and scroll box to the status bar.

According to the system and method disclosed herein, the present invention draws the user's attention to additional portions of the document not currently displayed and provides customization for more convenient scrolling.

DETAILED DESCRIPTION OF THE INVENTION

The present invention relates to an improvement in graphical user interfaces used for aiding a user in scrolling through a document. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
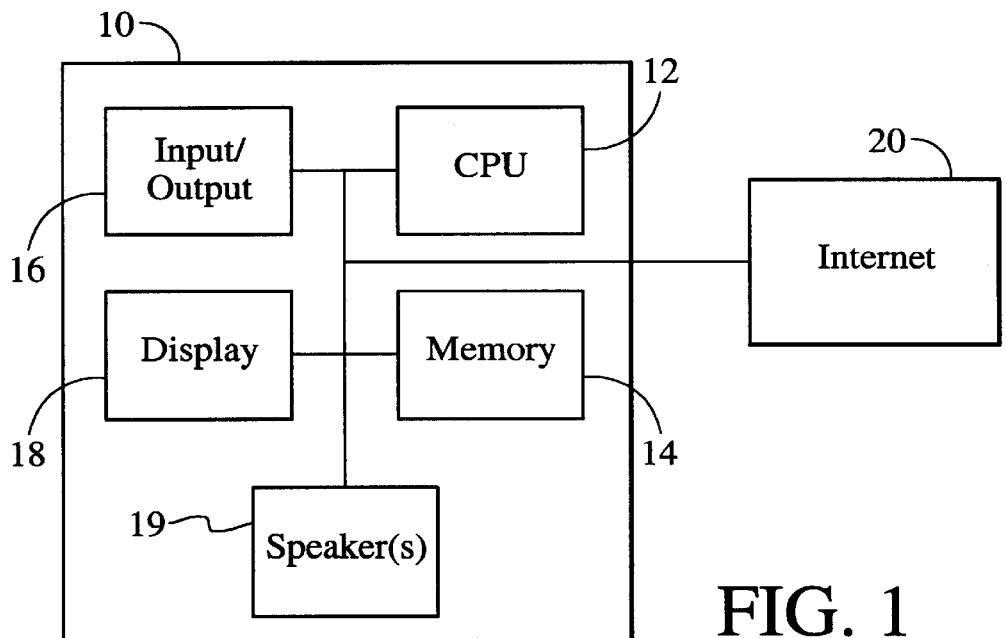
FIG. 1 is a block diagram of a computer system.

FIG. 1 is a block diagram including a computer system 10. The computer system 10 may include a processor 12, a memory 14, an input/output device 16, a display 18, and a speaker 19. The input/output device 16 may include a keyboard, a mouse, and other devices which a user can input information. The display 18 is used to provide visual information to the user. Typically, a graphical user interface (GUI) is provided to the display 18 to aid with user interaction. The speaker 19 is typically used to provide feedback, such as beeps or whistles, in response to a user performing an operation. The computer system 10 is also depicted as being coupled to an online service 20, such as the Internet.

Figure 2:
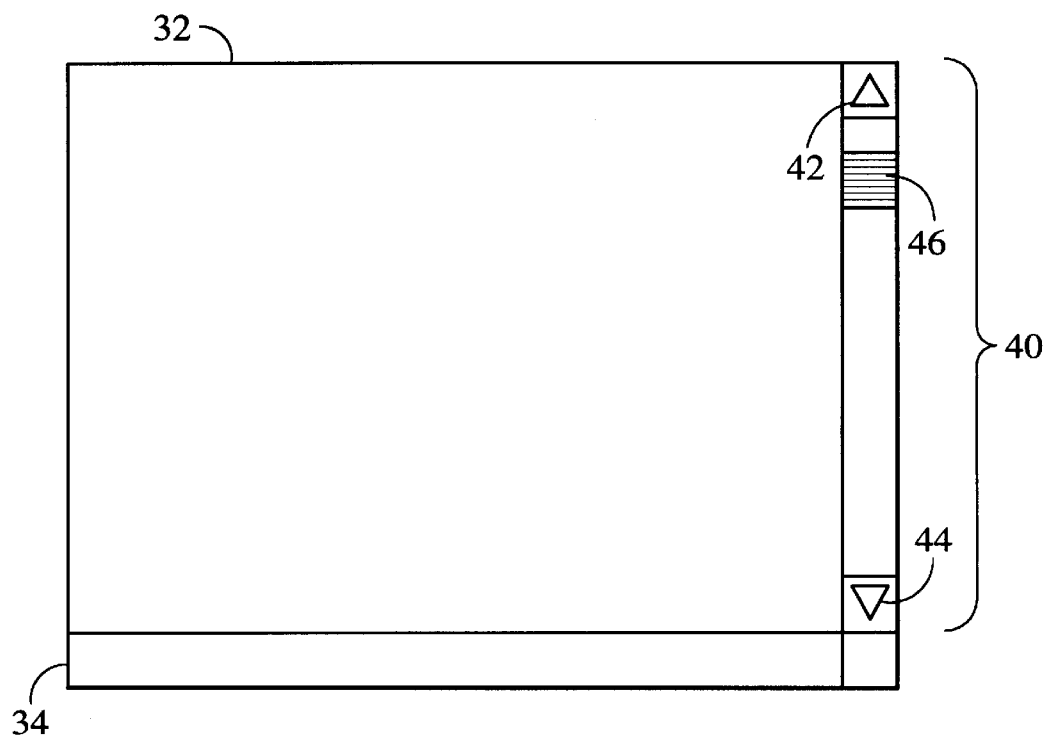
FIG. 2 is a block diagram depicting a window including a conventional scroll bar.

FIG. 2 depicts a window 30 that may be provided to the display 18 when a user accesses a document, not shown. The window 30 is part of a graphical user interface (GUI). The window 30 may be provided by a browser that accesses and displays html documents or other information from the online service 20; a word processing program that allows a user to create, view, and edit text documents; or other software through which a user can view information in a document. The window 30 includes a client area 32, a status bar 34, and a scroll bar 40. The document is provided to the client area 32. Although called a client area, the area 32 could contain text, graphical representations of objects or other information.

A document may contain more information than can be depicted in the window 30 at one time. For example, an html document accessed via the Internet 20 may contain multiple pages based on the size of the window. Thus, a browser may only display a page or other limited portion of the document in the window 30. The user must then be allowed to access other pages of the document. The presence of the conventional scroll bar 40 indicates that portions of the document may not be shown in the window. The scroll bar 40 also allows a user to scroll through portions of the document which may not be shown in the window 30. The scroll bar 40 includes scroll arrows 42 and 44, a scroll box 46, and a scroll shaft 48. By clicking on the scroll arrows 42 or 44, the user can scroll up or down, respectively, a discrete amount. By holding down the left button of a mouse (not explicitly shown) on a scroll arrow 42 or 44, the user can scroll continuously. By moving the scroll box 46, the user can more rapidly scroll vertically through the document displayed in the window 30. The position of the scroll box 46 in the scroll shaft 48 indicates the fraction of the document remaining to be scrolled to. The user can also use the scroll shaft 48 to scroll by clicking on the scroll shaft 48 or holding the left mouse button down on the scroll shaft 48. Although not depicted, the window 30 may also include a horizontal scroll bar. A horizontal scroll bar allows a user to scroll horizontally through portions of the document not depicted in the window 30.

Although the window 30 shown in FIG. 2 can display a document, those with ordinary skill in the art will realize that the user may not be aware of portions of the document not immediately displayed in the window 30. This is particularly true for inexperienced users. Furthermore, one of ordinary skill in the art will also realize that even an experienced user may merely forget that the document contains more information. This is due to the fact that the scroll bar 40 is designed to be unobtrusive and not catch the user's attention. The scroll bar 40 is placed to the extreme right edge of the window 30 in order to improve the user's ability to easily view information in the window 30. However, this makes the presence of the scroll bar 40 easy to forget or overlook. Thus, a user may not realize that a portion of the document is not currently displayed in the window 30. This is particularly true of content which a user views but does not generate, such as documents that are accessed via the Internet 20. Therefore, a user may miss important information not immediately displayed in the window 30.

The present invention provides a system and method for aiding a user in browsing and scrolling through a multiple-page document on a computer system including devices for audio and visual output, such as a display. The document is displayed through a graphical user interface (GUI) including a window. The window may display only a portion of the document at a time. The system and method comprise alerting a user to the fact that part of the document is not currently displayed. The method and system may also allow for customization and more convenient scrolling. A scroll bar and the components of the scroll bar allow a user to scroll through the document. In one aspect, the scroll bar briefly appears in the middle of the window and moves to a particular edge of the window. Preferably, the scroll bar is translucent while at the center of the window, but gradually becomes solid when at the edge of the window. In this aspect, the user may also dock the scroll bar at a desired position. In a second aspect, the method and system comprise providing a voice cue that indicates the total number of pages in the document when the document is first accessed by the user and optionally indicates the current page number when the user accesses a new page. In a third aspect, scrolling functions may be carried out by scroll arrows located at a status bar of the window. Thus user may keep a scroll shaft and scroll box at an edge of the window or dock the scroll shaft and scroll box to the status bar.

The present invention will be described in terms of a particular computer system displaying a particular document in a window. However, one of ordinary skill in the art will readily recognize that this method and system will operate effectively for other types of GUIs and other computer systems. The method and system will also operate effectively for multiple documents being displayed on the computer system. Furthermore, the method and system finds particular utility when used with multi-page documents not generated by the user, such as documents accessed via the worldwide web, the Internet, or other online service. However, the method and system operate effectively for other types of documents including those generated by the user. The method and system are also discussed in the context of three embodiments. The present invention is consistent with any combination of some or all of the three embodiments being used together. The present invention is also described in the context of a scroll bar used in scrolling vertically. However, aspects of the method and system are consistent with scroll bars used to scroll horizontally. Consequently, nothing prevents the method and system from being used for a horizontal scroll bar. Furthermore, the method and system are described in the context of flow charts depicting a particular order of steps. However, nothing prevents steps from being performed in another order, including performing steps concurrently.

Figure 3:
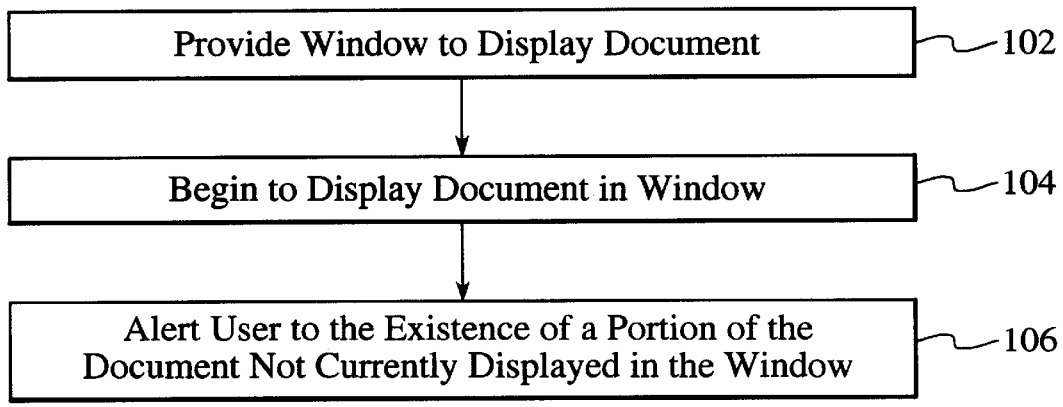
FIG. 3 is a high-level flow chart depicting a method in accordance with the present invention for aiding a user in scrolling through a document.

The present invention may be implemented in a computer system such as the computer system 10. To more particularly illustrate the method and system in accordance with the present invention, refer now to FIG. 3 depicting a high level flow chart of a method 100 for aiding a user in scrolling through a document. A window for displaying the document is provided, via step 102. In a preferred embodiment, a window in the GUI provided to the display 18 is opened, via step 102. For example, a window in a browser may be opened to display an html page accessed via the Internet 20. The window opened in step 102 includes a scroll bar when the document contains multiple pages. Display of the document is commenced, via step 104. If the window does not fit the entire document, then a portion of the document is started to be displayed in step 104. The user is alerted to the fact that a portion of the document is not currently displayed in the window, via step 106. In a preferred embodiment, step 106 includes providing a voice or visual cue to the user that is in addition to displaying a scroll bar or other component of the GUI used in scrolling. The visual cue preferably draws the user's attention to a component of the GUI used in scrolling, such as the scroll bar or a portion of the scroll bar. For example, in one embodiment, the step 106 may include temporarily providing animated arrows pointing to the scroll bar or moving the scroll bar. Also in a preferred embodiment, step 106 may be turned on or off by the user through a user option. Furthermore, in one embodiment step 104 and 106 may be performed concurrently, for example through separate threads.

Step 106 does more than merely furnish some indication that additional content may follow by unobtrusively providing a scroll bar or other mechanism for scrolling. Instead, step 106 actually draws the user's attention to the fact that a portion of the document is not currently displayed in the window. Because the user's attention has been temporarily drawn to the existence of a part of the document that is not currently displayed, the user is more likely to be aware that the document may contain additional information which is not currently shown on the display 18. Thus, the user is made aware that he or she has the option of scrolling to view additional content. Therefore, the user may be more likely to use the scroll bar to scroll to subsequent pages.

Figure 4:
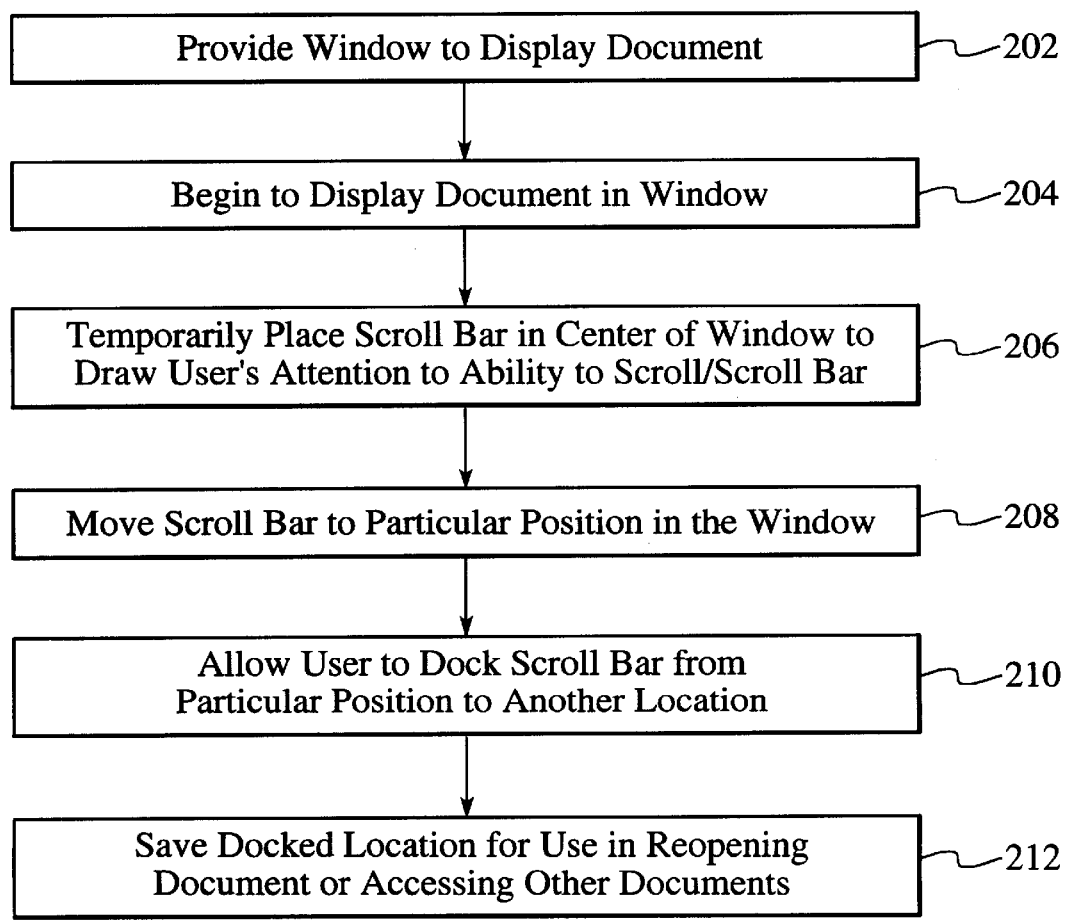
FIG. 4 is a more detailed flow chart depicting one embodiment of a method in accordance with the present invention for aiding a user in scrolling through a document by drawing the user's attention to the scroll bar.

FIG. 4 depicts a more detailed flow chart of one embodiment of a method 200 in accordance with the present invention. A window for displaying the document is provided via step 202. Display of the document is then begun, via step 204. As discussed with respect to the method 100, the step 204 may run concurrently with the remaining steps of the method 200. The user's attention is then drawn to the scroll bar, via step 206. In one embodiment, the scroll bar is then temporarily placed at the center of the window or in another portion of the window which will catch the user's attention, via step 206. In a preferred embodiment, the scroll bar is translucent at least when placed near the center of the window in step 206. The scroll bar is then moved to a particular position in the window, via step 208. In a preferred embodiment, the particular position is based on a default position or a previous position selected the last time the user viewed a document in the window. In a preferred embodiment, the user can watch the scroll bar as it zooms to the edge of the window in step 208. In an alternate embodiment, the scroll bar may disappear and reappear at an edge of the window. Also in a preferred embodiment, the translucent scroll bar gradually changes to be solid in appearance after moving to the particular position in step 208.

In a preferred embodiment, the scroll bar is also dockable. The user can, therefore, place the scroll bar a location which the user desires, via step 210. This location can be different from the edge to which the scroll bar was moved in step 208. Thus, the scroll bar can be moved from the default position or from the position previously selected by a user to a new location. When the method 200 is repeated, the position to which the scroll bar moves in step 208 may be based on the selection the user made in step 210 of the previous usage. For example, a left-handed user may wish to place the vertical scroll bar at the left edge of the window while a right-handed user may wish to place the scroll bar at the right edge of the window, which is normally the default position for a vertical scroll bar. In a preferred embodiment, step 210 may be performed a number of times to allow the user to move the scroll bar as desired. The position chosen in step 210 is then saved as the particular position, via step 212. Also in step 212, the position chosen in step 210 may be used in reopening the document or in accessing a similar type of document. When the document is reopened or another document is accessed, the method 200 is repeated. Although steps 210 through 212 are performed in a preferred embodiment, these steps are optional.

Figure 5A:
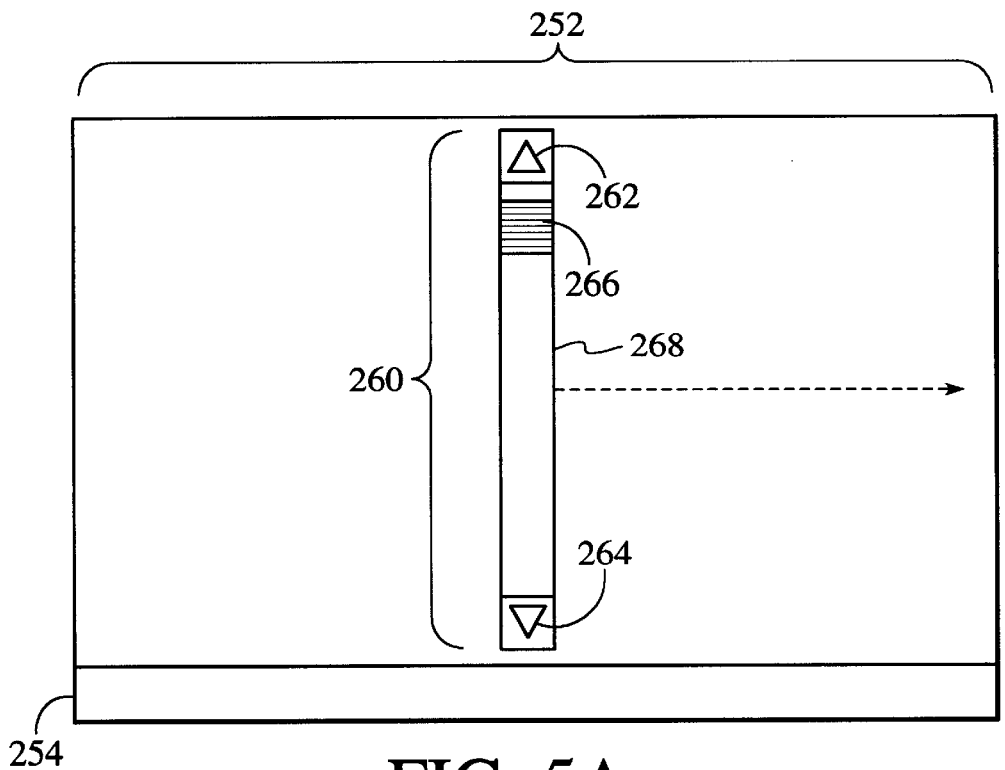
FIG. 5A is a block diagram of a computer display in accordance with the first embodiment of the present invention depicting the scroll bar briefly appearing at the center of the window.

FIG. 5A depicts a window 250 in accordance with the method 200 during the step 206. The window 250 includes a client area 252 and a status bar 254. The client area 252 will be used for displaying the document. The scroll bar 260 is displayed in the center of the client area 252 because step 206 is being performed. The scroll bar 260 includes up and down scroll arrows 262 and 264, respectively, a scroll box 266, and a scroll shaft 268. The scroll bar 260, the scroll box 266, the scroll shaft 268, and scroll arrows 262 and 264 are GUI components used in scrolling. As depicting by the dashed arrows, the scroll bar 260 is moving to the particular position.

Figure 5B:
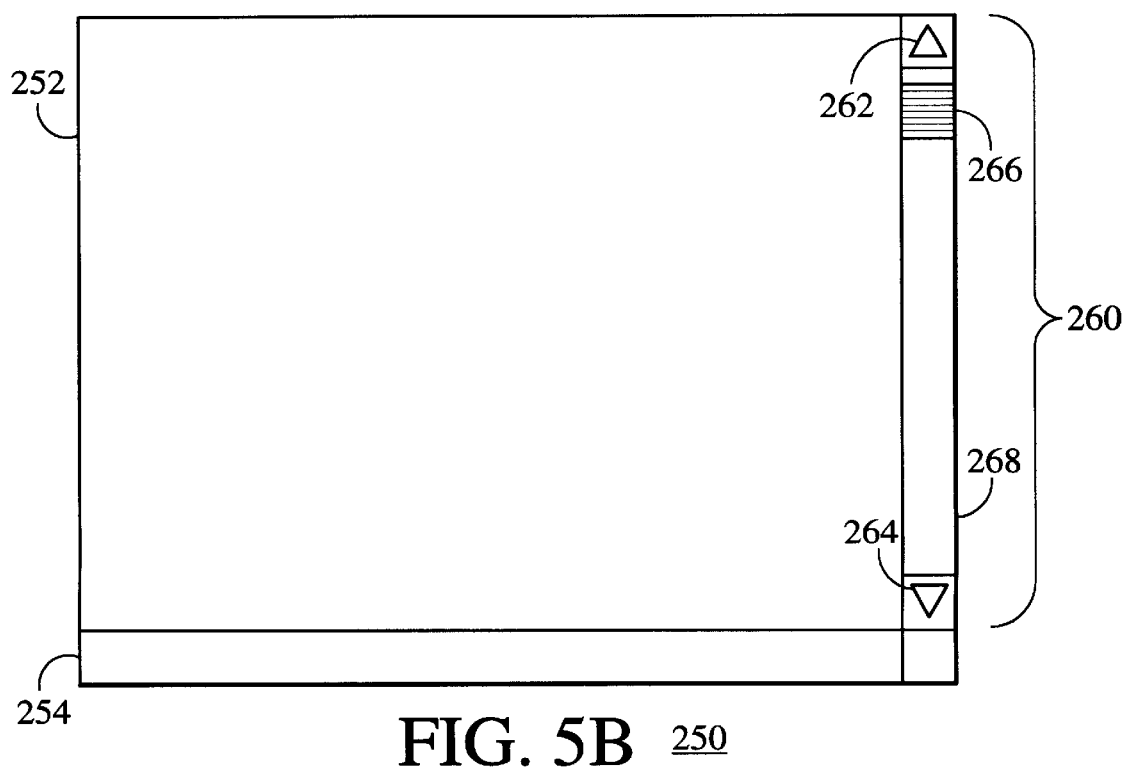
FIG. 5B is a block diagram of the computer display in accordance with first embodiment of the present invention after the scroll bar has moved to a particular location.
Figure 5C:
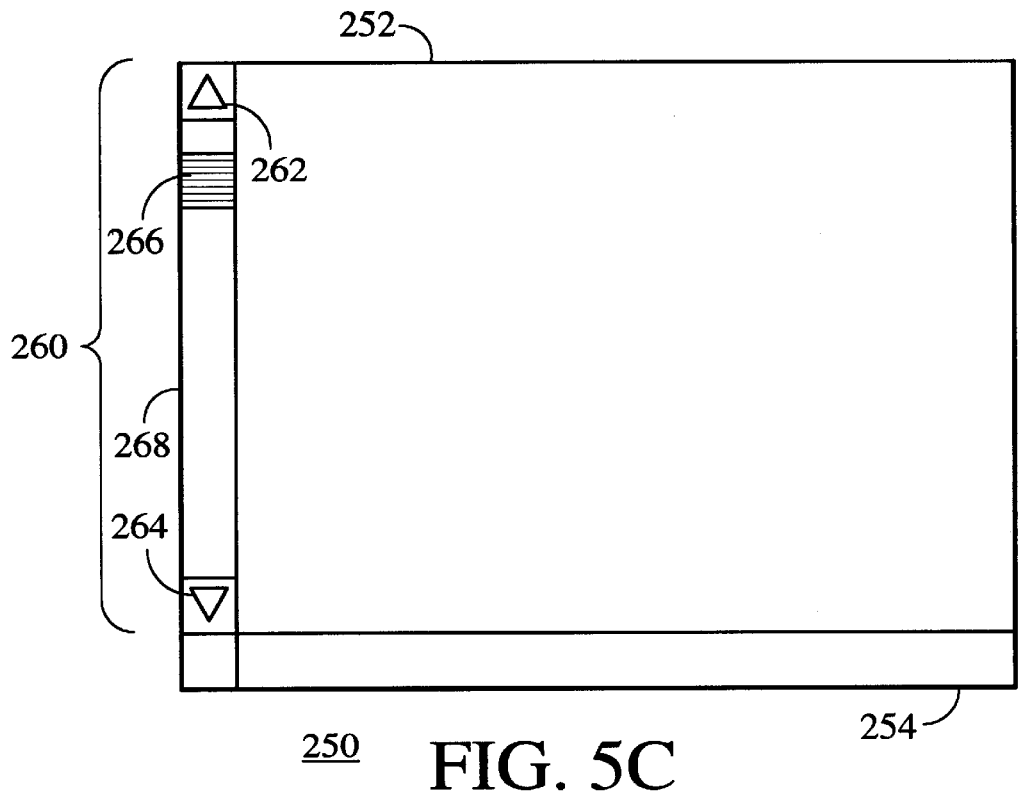
FIG. 5C is a block diagram of the computer display in accordance with first embodiment of the present invention after the scroll bar has been docked as the user desires.

FIGS. 5B and 5C depict embodiments of the window 250 after step 208 has been completed. As depicted in FIG. 5B, the scroll bar 260 has moved to the right edge of the window 250. The window 250 may be preferred by right-handed users. As depicted in FIG. 5C, the scroll bar 260 has moved to the left edge of the window 250. For example, a user may have docked the scroll bar 260 at the left edge of the window 250 in step 210 of the method 200. The window 250 may be preferred by left-handed users. In either case, the location of the scroll box 266 in the scroll shaft 268 may indicate the fraction of the document left to be scrolled through. Thus, when the scroll box 266 is near the up arrow 262, a first portion of the document is being displayed. When the scroll box 266 is near the down arrow 264, a later portion of the document is being displayed.

Because the scroll bar 260 is temporarily located at the center of the window 250 then moves to the particular position in the window 250, the user's attention is drawn to the scroll bar 260. As a result, the scroll bar 260 does more than merely indicate that the user can scroll. The initial position of the scroll bar 260 and subsequent movement actually draw the user's attention to the scroll bar 260 and the existence of a portion of the document that is not currently displayed in the window 250. Consequently, the user will be aware of the scroll bar 260 and better understand that the document being displayed in the window 250 may contain additional information not currently being displayed.

Figure 6:
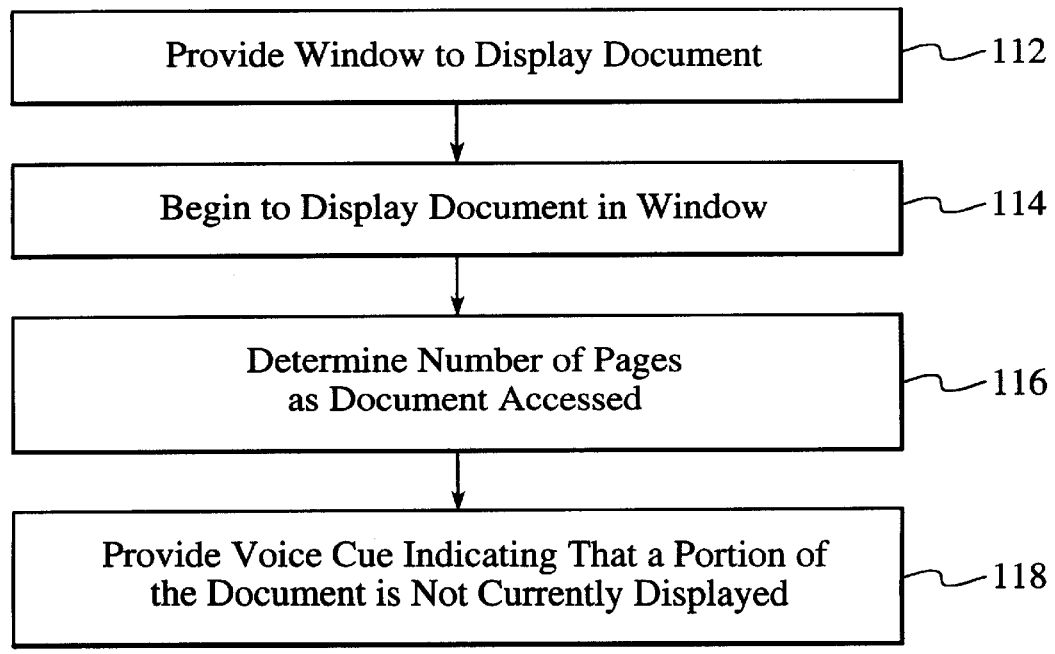
FIG. 6 is a more detailed flow chart depicting a second embodiment of a method in accordance with the present invention for aiding a user in scrolling through a document by providing a voice cue.

FIG. 6 depicts a flow chart of a second embodiment of a method 110 in accordance with the present invention. A window is provided in which the document is to be displayed, via step 112. Display of the document is then commenced, via step 114. The number of pages may then be counted as the document is downloaded or opened, via step 116. A voice cue is provided, via step 118. The voice cue provided in step 118 draws the user's attention to the fact that a portion of the document is not currently displayed in the window. For example, the voice cue may indicate the total number of pages in the document when the document is first opened. In a preferred embodiment, the voice cue also optionally states the current page when a subsequent page is displayed in the window. The voice cue could state that the first page of the total number of pages is being displayed. In an alternate embodiment, each time a user scrolls to a new page the voice cue also indicates the current page of the total number of pages, via optional step 118. In one embodiment, the voice cue can state that the document contains more than one page. This embodiment may be used when the total number of pages in the document may not be accurately determined or when the total number of pages may not be determined rapidly enough to provide the voice cue when desired. Because a voice cue is provided indicating the total number of pages or indicating that the document contains multiple pages, the user is made aware that additional information may be viewed. The user can also turn the voice mechanism on and off or can customize the voice feature through a user option.

Figure 7:
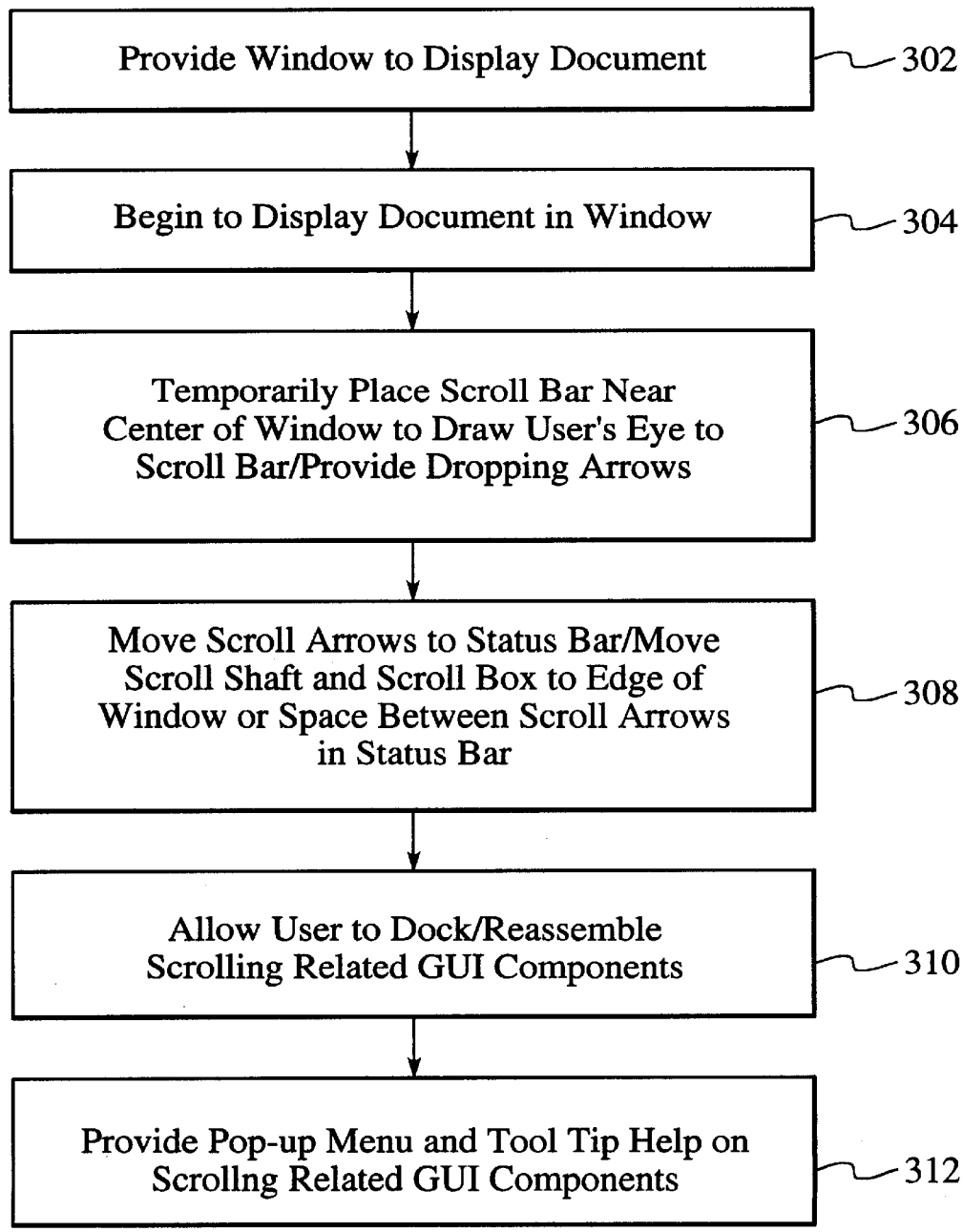
FIG. 7 is a flow chart depicting a third embodiment of a method in accordance with the present invention for aiding a user in scrolling through a document.

FIG. 7 depicts a more detailed flow chart of a third embodiment of a method 300 in accordance with the present invention. A window for displaying the document is provided via step 302. The document is started to be displayed, via step 304. As discussed previously, the step 304 can be performed concurrently with other steps. Furthermore, as with the methods 100, 110, and 200, the steps can be performed in an order other than what is depicted. The GUI components used in scrolling, including the scroll bar, are temporarily placed at the center of the window to catch the user's attention, via step 306. In a preferred embodiment, the scroll bar is translucent at least while the scroll bar is placed near the center of the window in step 306. A portion of the GUI components used in scrolling is moved to the status bar of the window, via step 308. In a preferred embodiment, the up and down arrows of the scroll bar are moved to the status bar in step 308, while the scroll box and scroll shaft move to an edge of the window. Also in a preferred embodiment, the user can watch the GUI components used in scrolling as they move in step 308. In an alternate embodiment, steps 306 and 308 may include providing animated arrows dropping to the portion of the GUI components used at the status bar instead of briefly placing the scroll bar at the center of the window. In a preferred embodiment, the scroll bar or other components used in scrolling may be docked between the status bar and an edge of the window. Thus, in step 308, different GUI components used in scrolling may be moved to different locations in the window.

The user is then allowed to dock or reassemble scrolling related GUI components, via step 310. Pop-up menus or tool tip text relating to the parts of the scroll bar or other scrolling related GUI components are then provided, via step 312. The pop-up menus and tool tip text aid the user in using or customizing the scroll bar. Thus, the method 300 draws the user' attention to the scrolling related GUI components, such as the scroll bar, the scroll shaft, the up and down arrows, and the scroll box. The method 300 also provides customization of and help in using the scrolling related GUI components.

Figure 8A:
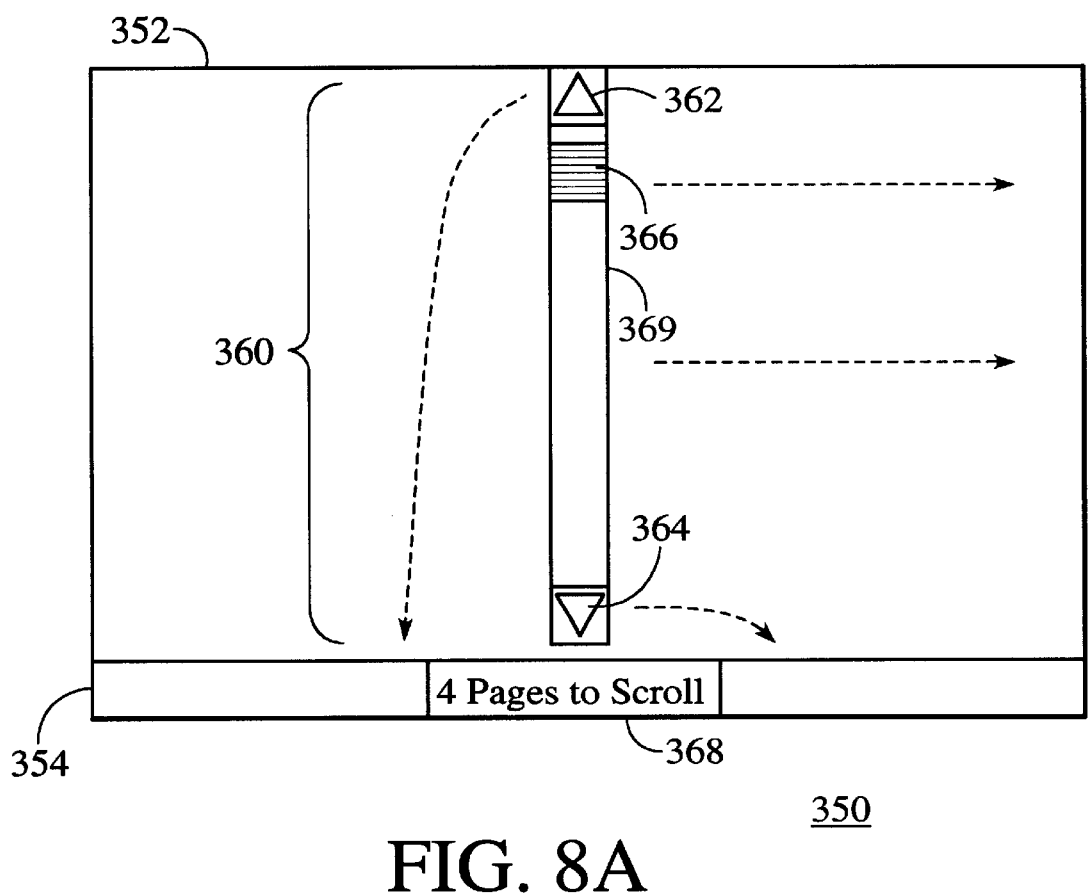
FIG. 8A is a block diagram of a computer display in accordance with the third embodiment of the present invention depicting the movement of scroll arrows from the center of the window to the status bar and the movement of the scroll shaft and scroll bar from the center of the window to the edge of the window.

FIG. 8A depicts a window 350 in accordance with the method 300 during the step 306. The window 350 includes a client area 352 and a status bar 354. The client area 352 will be used for displaying the document. The scroll bar 360 is displayed in the center of the client area 352 because step 304 is being performed. The scroll bar 360 includes up and down scroll arrows 362 and 364, respectively. The scroll bar 360 also includes a scroll box 366 and a scroll shaft 369. Preferably, the scroll bar 360 is translucent. After the translucent scroll bar 360 briefly appears in center of the window 350, the up arrow 362 and the down arrow 364 of the scroll bar 360 move to the status bar 354 of the window 350. While at the status bar 354, the up arrow 362 and the down arrow 364 may be separated by a space 368 which can contain a message. The message may indicate the total number of pages, or that there are multiple pages in the document, or provide other information. The user can also choose to dock the scroll box 366 and the scroll shaft 369 in the space 368 between the up arrow 362 and the down arrow 364. After the scroll shaft 369 and scroll box 366 are docked in the space 368, the space 368 may change shade or color to indicate it contains the scroll shaft 369 and scroll box 366. The user can dock the scroll box 366 or scroll shaft 369 by dragging it or clicking the right mouse button. In FIG. 8A, the scroll box 366 and scroll shaft 369 are depicted at the right edge of the window 350. In an alternate embodiment, the scroll box 366 and scroll shaft 369 can be located elsewhere in the window 350. In either case, the location of the scroll box 366 in the scroll shaft 369 may indicate the amount of the document left to be scrolled through.

In a preferred embodiment, the portion of the scroll bar 360 at the status bar 354 indicates the amount of the document remaining to be scrolled through. For example, as depicted in FIG. 8A, portions of the up arrow 362 and the down arrow 364 are shaded. The shaded portions of the arrows 362 and 364 indicate the amount of the document remaining to be viewed. In a preferred embodiment, the shaded portion is also colored, rather than gray, in order to draw the user's attention to the indication of the amount of the document remaining to be scrolled through. The unshaded portions of the arrows 362 and 364 indicated the amount of the document which has been viewed. By single clicking on the up arrow 362 or the down arrow 364, the user can scroll up or down a page. By holding the mouse button down continuously on the up arrow 362 or the down arrow 364, the user can scroll up or down, respectively, continuously. These functions are similar to conventional scrolling. However, there are added functions. Using the scroll arrows 362 and 364 may be sufficient for browsing through many html documents. This is because typical html documents only contain a few pages. When scrolling through documents containing many pages, the user may desire to restore the scroll box 366 and scroll shaft 369 to the edge of the window 350.

Figure 8B:
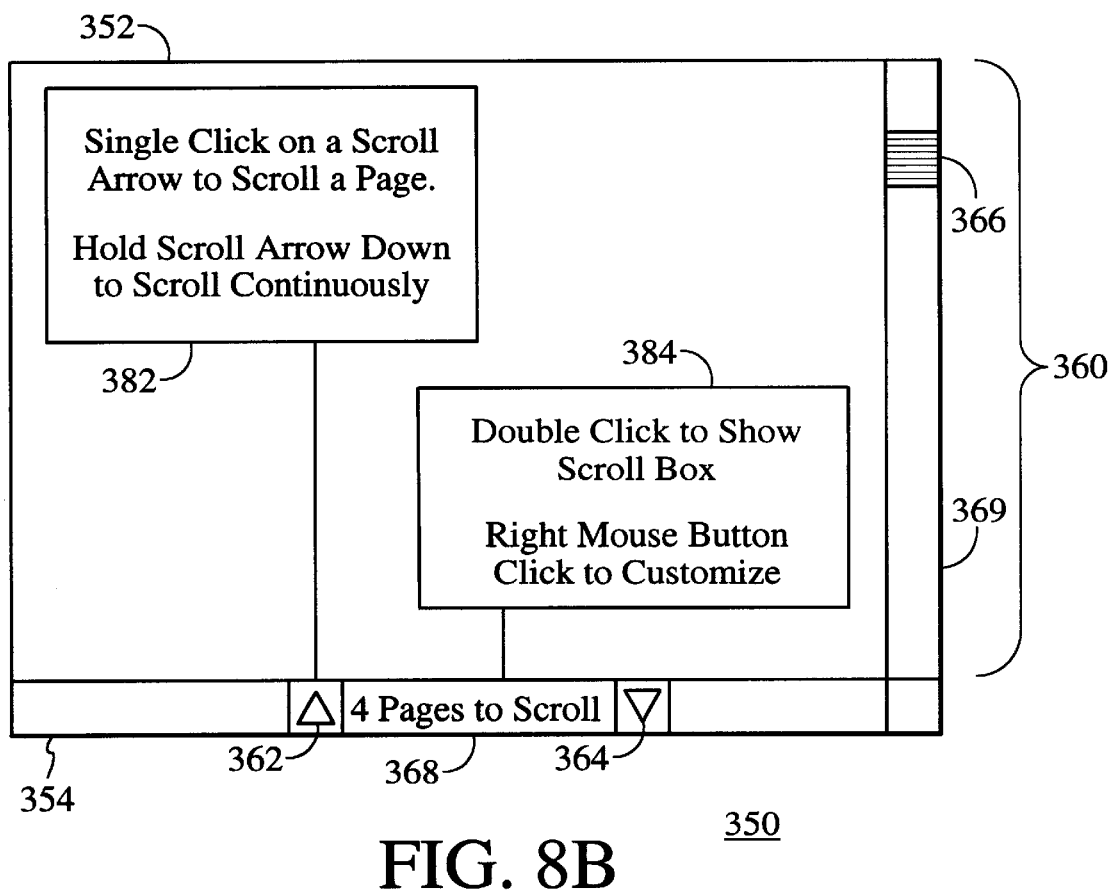
FIG. 8B is a block diagram of a computer display in accordance with the third LO embodiment of the present invention depicting tool tip text for portions of the GUI related to scrolling.

FIG. 8B depicts another embodiment of the window 350 in which tool tip text may be provided to a user. The user can invoke tool tip text by resting the cursor (not shown) on a portion of the window 250. Tool tip text 382 and 384 are shown for the up arrow 362 and scroll box 366, respectively. The tool tip text 382 and 384 indicate to the user how to move the scrolling related GUI components to other locations or how to use the corresponding scrolling related components, such as the up arrow 362. This is particularly beneficial in the window 350 depicted in FIG. 8C because the scroll box 366, scroll shaft 369, up arrow 362, and down arrow 364 are in different locations than the user might expect. Thus, the user is aided in scrolling and accessing different functions provided by the method and system.

Figure 8C:
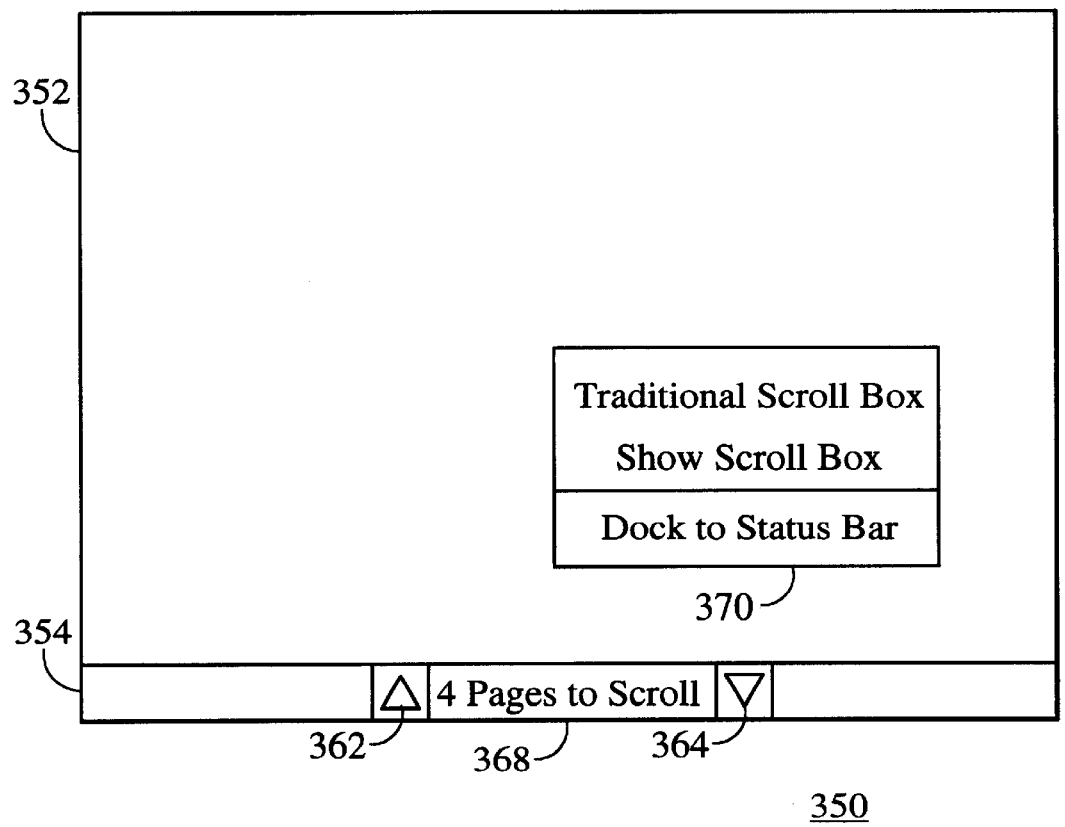
FIG. 8C is a block diagram of a computer display in accordance with the third embodiment of the present invention depicting a pop-up menu to allow the user to customize the portions of the GUI related to scrolling.

FIG. 8C depicts another embodiment of the window 350 where the scroll box 366 and scroll shaft 369 have been docked to the space 368 between the up arrow 362 and the down arrow 364. Thus, the space at the edge of the window 350 formerly occupied by the scroll box 366 and scroll shaft 369 has been freed. Furthermore, the space 368 may be shaded to indicate that the scroll box 366 and scroll shaft 369 have been docked to the status bar 354. The scroll shaft 369 and scroll box 366 can be docked back at their former positions, depicted in FIG. 8B, or in another position. In a preferred embodiment, a pop-up menu 370 may be displayed when the user clicks the right mouse button while the cursor (not shown) is placed on the scroll shaft 369. The pop-up menu 370 may allow the user to restore GUI components, including as the scroll box 366, scroll shaft 369, and up and down arrows 362 and 364, respectively, to a more traditional style, as depicted in FIG. 5B. The pop-up menu 370 may also allow a user to restore only the scroll box 366 and scroll shaft 364 to a desired location. When the GUI components are moved to or docked at an edge, right-mouse clicking on the components can invoke a pop-up menu which contains the option of docking related GUI components to the status bar 354. Also in a preferred embodiment, the position of the scroll bar is saved to be used when reopening the document.

Because the vertical scroll bar 360 may be located in the status bar 354, more area of the window 350 may be freed. This is beneficial for users having displays 18 which are small. Moreover, the location of the up arrow 362 and the down arrow 364 in the status bar 354 makes it simple for a user to reach the arrow 362 and 364. This is because a user's eyes naturally move to a lower portion of the window 350 when reading to the bottom of a page. Because the scroll bar 360 can be placed in the status bar 354 or at an edge of the window 350, the system and method provide user customization and increased flexibility. In a preferred embodiment, all of the above methods for aiding the user in scrolling can be turned on or off, further increasing the flexibility of the present invention. Consequently, scrolling is facilitated.

A method and system has been disclosed for aiding a user in scrolling through a document. Software written according to the present invention can be stored in some form of computer-readable medium, such as memory or CD-ROM, or transmitted over a network, and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer system for aiding a user in scrolling through a document, the computer system comprising:
   a display;
   means for displaying a first portion of the document in a window, the user being capable of scrolling through a second portion of the document not currently displayed in the window; and
   means coupled with the displaying means for alerting the user to a second portion of the document not currently displayed in the window, wherein the alerting means further include
   means for providing a scroll bar for allowing a user to scroll through the document; and
   wherein the alerting means further place the scroll bar for a particular amount of time at the center of the window then move the scroll bar to a first position in the window.

2. The computer system of claim 1 further comprising:
   means for providing a voice cue indicating a number of pages in the document when the document is first accessed by a user.

3. The computer system of claim 1 wherein the scroll bar is capable of being docked at a selected location in the window.

4. The computer system of claim 3 further comprising:
   means for automatically placing the scroll bar at the selected location when the document is reopened.

5. A computer system for aiding a user in scrolling through a document, the computer system comprising:
   a display;
   means for displaying a first portion of the document in a window, the user being capable of scrolling through a second portion of the document not currently displayed in the window; and
   means coupled with the displaying means for alerting the user to a second portion of the document not currently displayed in the window, wherein the alerting means further include:
   means for providing a voice cue indicating that the second portion of the document is not currently displayed when the document is first accessed by a user.

6. The computer system of claim 5 further wherein the voice cue providing means further include:
   means for providing a voice cue indicating a current page of the number of pages, the current page being displayed in the particular window.

7. A computer system for aiding a user in scrolling through a document, the computer system comprising:
   a display;
   means for displaying a first portion of the document in a window, the user being capable of scrolling through a second portion of the document not currently displayed in the window; wherein the window further includes a status bar,
   means coupled with the displaying means for alerting the user to a second portion of the document not currently displayed in the window,
   means for providing a plurality of components for aiding a user in scrolling; and
   wherein the alerting means place the plurality of components for a particular amount of time at the center of the window and move a portion of the plurality of components to the status bar.

8. The computer system of claim 7 wherein the plurality of components can be assembled to provide a scroll bar.

9. The computer system of claim 7 wherein the plurality of components further include an up arrow and a down arrow.

10. The computer system of claim 8 wherein the up arrow and the down arrow further include shading, the shading indicating a remaining portion of the document.

11. The computer system of claim 8 wherein the up arrow allows a user to scroll up a page in the document by single clicking on the up arrow.

12. The computer system of claim 10 wherein the down arrow allows a user to scroll down a page in the document by single clicking on the up arrow.

13. The computer system of claim 7 wherein the status bar further includes an area capable of indicating when the portion of the plurality of components are located at the status bar.

14. The computer system of claim 7 further comprising:
   means for providing a voice cue indicating a number of pages in the document when the document is first accessed by a user.

15. The computer system of claim 7 wherein the status bar further includes:
   means for notifying a user of a number of subsequent pages in the document.

16. The computer system of claim 7 wherein the plurality of components further include a scroll box and a scroll shaft, and wherein the alerting means move the scroll box and scroll shaft to a particular position in the window.

17. The computer system of claim 7 wherein each of the plurality of components can be docked at a desired location in the window.

18. A method for aiding a user in scrolling through a document on a computer system having a display, the method comprising the steps of:
   (a) providing a window for displaying a first portion of the document; and
   (b) alerting the user to a second portion the document not currently displayed in the window;
   (c) providing a scroll bar for allowing a user to scroll through the document; and wherein the alerting step (b) further includes
      (b1) placing the scroll bar for a particular amount of time at the center of the window then move the scroll bar to a first position in the window;
   wherein the user is capable of scrolling through the second portion of the document not currently displayed in the window.

19. The method of claim 18 further comprising the step of:
   (d) providing a voice cue indicating a number of pages in the document when the document is first accessed by a user.

20. The method of claim 18 wherein the scroll bar providing step (c) further includes the step of:
   (c1) providing the scroll bar capable of being docked at a selected location in the window.

21. The method of claim 20 further comprising the step of:
   (e) automatically placing the scroll bar at the selected location when the document is reopened.

22. A method for aiding a user in scrolling through a document on a computer system having a display, the method comprising the steps of:
   (a) providing a window for displaying a first portion of the document; and
   (b) alerting the user to a second portion the document not currently displayed in the window; wherein the alerting step (b) further includes:
      (b1) providing a voice cue indicating that the second portion of the document is not currently displayed when the document is first accessed by a user and
   wherein the user is capable of scrolling through the second portion of the document not currently displayed in the window.

23. The method of claim 22 further comprising the step of:
   (c) providing a voice cue indicating a current page of the number of pages, the current page being displayed in the particular window.

24. A method for aiding a user in scrolling through a document on a computer system having a display, the method comprising the steps of:
   (a) providing a window for displaying a first portion of the document; and
   (b) alerting the user to a second portion the document not currently displayed in the window, wherein the window further includes a status bar;
   (c) providing a plurality of components for aiding a user in scrolling; wherein the alerting step (b) further includes the step of
      (b1) placing the plurality of components for a particular amount of time at the center of the window and move a portion of the plurality of components to the status bar; and
   wherein the user is capable of scrolling through the second portion of the document not currently displayed in the window.

25. The method of claim 24 wherein the plurality of components can be assembled to provide a scroll bar.

26. The method of claim 24 wherein the plurality of components further include an up arrow and a down arrow.

27. The computer system of claim 24 wherein the up arrow and the down arrow further include shading, the shading indicating a remaining portion of the document.

28. The computer system of claim 25 wherein the up arrow allows a user to scroll up a page in the document by single clicking on the up arrow.

29. The computer system of claim 24 wherein the down arrow allows a user to scroll down a page in the document by single clicking on the up arrow.

30. The computer system of claim 24 wherein the status bar further includes an area capable of indicating when the portion of the plurality of components are located at the status bar.

31. The method of claim 24 further comprising the step of:
   (d) providing a voice cue indicating a number of pages in the document when the document is first accessed by a user.

32. The method of claim 24 wherein the status bar further includes means for notifying a user of a number of subsequent pages in the document.

33. The method of claim 24 wherein the plurality of components further include a scroll box and a scroll shaft, and wherein the alerting means move the scroll box and scroll shaft to a particular position in the window.

34. The method of claim 24 wherein each of the plurality of components can be docked at a desired location in the window.

35. A computer-readable medium containing a program for aiding a user in scrolling through a document on a computer system, the program including instructions for:
   (a) providing a window for displaying a first portion of the document;
   (b) alerting the user to a second portion the document not currently displayed in the window; and
   (c) providing a scroll bar for allowing a user to scroll through the document; and wherein the alerting instructions (b) further includes instructions for
      (b1) placing the scroll bar for a particular amount of time at the center of the window then move the scroll bar to a first position in the window and
   wherein the user is capable of scrolling through the second portion of the document not currently displayed in the window.

36. A computer-readable medium containing a program for aiding a user in scrolling through a document on a computer system, the program including instructions for:
   (a) providing a window for displaying a first portion of the document; and
   (b) alerting the user to a second portion the document not currently displayed in the window; wherein the alerting instruction (b) further includes the instructions for
      (b1) providing a voice cue indicating that the second portion of the document is not currently displayed when the document is first accessed by a user.

37. A computer-readable medium containing a program for aiding a user in scrolling through a document on a computer system, the program including instructions for:

(a) providing a window for displaying a first portion of the document;

(b) alerting the user to a second portion the document not currently displayed in the window, wherein the window further includes a status bar;

(c) providing a plurality of components for aiding a user in scrolling; and wherein the alerting instructions (b) further includes instructions for (b1) placing the plurality of components for a particular amount of time at the center of the window and move a portion of the plurality of components to the status bar;

wherein the user is capable of scrolling through the second portion of the document not currently displayed in the window.

* * * * *